(12) United States Patent
Nakamura

(10) Patent No.: US 8,200,016 B2
(45) Date of Patent: Jun. 12, 2012

(54) METHOD AND APPARATUS FOR CHARACTER STRING RECOGNITION

(75) Inventor: Hiroshi Nakamura, Nagano (JP)

(73) Assignee: Nidec Sankyo Corporation (JP)

( * ) Notice: Subject to any disclaimer, the term of this patent is extended or adjusted under 35 U.S.C. 154(b) by 1049 days.

(21) Appl. No.: 12/110,524

(22) Filed: Apr. 28, 2008

(65) Prior Publication Data

US 2008/0304746 A1    Dec. 11, 2008

(30) Foreign Application Priority Data

Apr. 27, 2007   (JP) ................................ 2007-118454

(51) Int. Cl.
G06K 9/34    (2006.01)

(52) U.S. Cl. ...................... 382/177; 382/173; 382/174

(58) Field of Classification Search ........................ None
See application file for complete search history.

(56) References Cited

U.S. PATENT DOCUMENTS

| | | | | |
|---|---|---|---|---|
| 5,034,991 | A * | 7/1991 | Hagimae et al. | 382/209 |
| 5,253,304 | A * | 10/1993 | LeCun et al. | 382/102 |
| 5,825,920 | A * | 10/1998 | Kitamura et al. | 382/178 |
| 5,889,884 | A * | 3/1999 | Hashimoto et al. | 382/168 |
| 6,282,314 | B1 * | 8/2001 | Sugiura et al. | 382/173 |
| 6,327,384 | B1 * | 12/2001 | Hirao et al. | 382/173 |
| 6,473,517 | B1 * | 10/2002 | Tyan et al. | 382/105 |
| 6,535,619 | B1 * | 3/2003 | Suwa et al. | 382/101 |
| 2002/0159636 | A1 * | 10/2002 | Lienhart et al. | 382/176 |
| 2006/0013511 | A1 * | 1/2006 | De Champlain et al. | 382/321 |
| 2006/0120602 | A1 * | 6/2006 | Tang et al. | 382/176 |

FOREIGN PATENT DOCUMENTS

| | | |
|---|---|---|
| JP | 7-129713 | 5/1995 |
| JP | 9-16715 | 1/1997 |
| JP | 2001-22884 | 1/2001 |

OTHER PUBLICATIONS

Xiaodan Jia; Xinnian Wang; Wenju Li; Haijiao Wang "A Novel Algorithm for Character Segmentation of Degraded License Plate Based on Prior Knowledge", 2007 IEEE International Conference on Automation and Logistics, 249-253.*

Byeong Rae Lee et al. "Adaptive local binarization method for recognition of vehicle license plates", IWCIA 2004, LNCS 3322, pp. 646-655.*

Yungang Zhang; Changshui Zhang "A new algorithm for character segmentation of license plate", Proceedings IEEE Intelligent Vehicles Symposium, 2003, 106-109.*

* cited by examiner

*Primary Examiner* — Li Liu
(74) *Attorney, Agent, or Firm* — Cantor Colburn LLP

(57) ABSTRACT

A method for character string recognition may include processing image data into black-and-white binary image data, calculating vertical projection data of the binary image data in a vertical direction perpendicular to a direction of the character string while shifting the binary image data, detecting positions exceeding a prescribed border judgment threshold value in the vertical projection data, judging validity of the border judgment threshold value, and deciding whether to segment characters out of the character string based on whether the border judgment threshold value is valid.

11 Claims, 14 Drawing Sheets

FIG. 3

```
P<JPNSANKYO<<HANAKO<BCDEFGILMQRTUVWXYZ<<<<<<
0987654326JPN8503172F1210082<<<<<<<<<<<<<<6
```

METHOD AND APPARATUS FOR CHARACTER STRING RECOGNITION

CROSS REFERENCE TO RELATED APPLICATION

The present invention claims priority under 35 U.S.C. §119 to Japanese Application No. 2007-118454 filed on Apr. 27, 2007, which is incorporated herein by reference.

FIELD OF THE INVENTION

The present invention relates to a method and apparatus for character string recognition to be used for optically reading a character string placed on media such as, but not limited to, paper and plastic materials.

BACKGROUND

Conventionally there are apparatuses for recognizing a character string printed on a surface of a medium such as a check. For example, in quite a few apparatuses for character string recognition commonly known; a character part is segmented along a circumscribing rectangular frame after detecting the character part from binarized image data, characteristic vectors are extracted from an obtained character pattern, similarity is calculated between the characteristic vectors of the entered character pattern and standard vectors of each character out of a characteristic dictionary, and then a candidate character(s) is selected according to a level of the similarity.

Some of those apparatuses for character string recognition include various means such as re-binarizing operation according to recognition results in order to improve recognition accuracy, and reading the medium again in case of failed reading operation (For example, refer to Patent Documents 1 through 3).

To describe more concretely; in a technology disclosed by Patent Document 1, character recognition is carried out again with image data binarized by using a different threshold value when normal character recognition results have not been obtained. In a technology disclosed by Patent Document 2, it is judged whether binary conversion of multilevel image is needed again or not, according to character recognition results and a result on the count number of black dots; and if needed, another threshold value being different from the initial one is set and the multilevel image is binarized again by using the threshold value newly set. In a technology disclosed by Patent Document 3, if recognition accuracy is lower than a prescribed requirement value, the character image is read again and then binary conversion is carried out by using a changed threshold value for binary conversion.

[Patent Document 1]
Japanese Unexamined Patent Publication (Kokai) No. JP2001-022884
[Patent Document 2]
Japanese Unexamined Patent Publication (Kokai) No. JP09-016715
[Patent Document 3]
Japanese Unexamined Patent Publication (Kokai) No. JP07-129713

SUMMARY

However, in the technology disclosed by Patent Document 1, validity of the binary conversion becomes clear only after obtaining the character recognition results so that waste of time is caused. Furthermore, if a first binary conversion is carried out inadequately, unexpected results may be brought about. The technology disclosed by Patent Document 2 also makes use of the character recognition results in the same manner as the technology disclosed by Patent Document 1. Therefore, validity of the binary conversion becomes clear only at the final stage of the process execution, and it leads to waste of time. In the technology disclosed by Patent Document 3, the character image is read again, and therefore the process of the technology takes time unnecessarily. Any of those technologies described above therefore does hardly improve operation speed of character string recognition.

The present invention may provide a method and apparatus for character string recognition that can improve accuracy of character recognition and ensure high-speed operation of character recognition.

Means to Solve the Problem

To solve the problem identified above, at least an embodiment of the present invention may provide the following aspects.

(1) A method for character string recognition by processing image data obtained through picking up a character string placed on a medium comprising: a first step of processing the image data into black-and-white binary image data by using a prescribed reference threshold value for binary conversion; a second step of calculating vertical projection data of the binary image data in a vertical direction perpendicular to a direction of the character string while shifting the binary image data in the direction of the character string; a third step of detecting positions exceeding a prescribed border judgment threshold value in the vertical projection data obtained through the second step described above as segmentation positions of characters included in the character string; and a fourth step of segmenting the characters out of the character string according to the segmentation positions of the characters detected through the third step, and examining characteristics of each character segmented; and further including: a fifth step of judging validity of the border judgment threshold value before the fourth step according to the number of characters included in the character string.

According to at least an embodiment of the present invention; the method for character string recognition includes; processing image data obtained through picking up a character string placed on a medium into black-and-white binary image data; calculating vertical projection data of the binary image data; detecting positions exceeding a prescribed border judgment threshold value in the vertical projection data as segmentation positions of characters; and examining characteristics of each character. Furthermore, validity of the border judgment threshold value is judged according to the number of characters included in the character string before examining the characteristics of each character so that character recognition can be carried out precisely and quickly.

Namely, accuracy of character recognition can be improved by judging validity of the border judgment threshold value according to the number of characters included in the character string; and since this judging step is carried out before examining the characteristics of each character, quick operation performance of character recognition can be maintained (Operation of examining the characteristics of each character may take much time due to some reasons; for example, a process of pattern matching is required, etc.).

The above description, i.e., "judging validity of the border judgment threshold value according to the number of characters included in the character string" means that any process may be applied as long as validity of the border judgment threshold value is judged according to the number of characters included in the character string. For example, while a border judgment threshold value is calculated by referring to the number of characters included in the character string, the result of this calculation is compared with another border judgment threshold value whose validity is already confirmed in advance. Then, a judgment may be made in such a way; the border judgment threshold value is determined to be valid if the former is greater than the latter, whereas it is determined to be invalid if the former is not greater than the latter.

The "characters" referred to in this specification document may include not only commonly-used alphabet letters but also symbol characters, pictographic characters, bar codes, and numeric characters; and the characters may be in any form and size as far as the characters can be recognized visually on the medium.

(2) The method for character string recognition: wherein the reference threshold value for binary conversion is changed when the border judgment threshold value is judged to be invalid by the fifth step, and the image data is processed again into binary image data, and then the first step through the fifth step are carried out again.

According to at least an embodiment of the present invention; when the border judgment threshold value is judged to be invalid by the fifth step, the reference threshold value for binary conversion described above is changed to process the image data again into binary image data, and then the second step through the fifth step are carried out again. Therefore, improvement in accuracy of character recognition can be implemented together with high-speed operation performance in character recognition.

(3) The method for character string recognition: wherein the reference threshold value for binary conversion is changed to be smaller than the initial one when the border judgment threshold value is judged to be invalid by the fifth step.

According to at least an embodiment of the present invention; when the border judgment threshold value is judged to be invalid by the fifth step, the reference threshold value for binary conversion is changed to be smaller than the initial one. Therefore, improvement in accuracy of character recognition can be implemented together with high-speed operation performance in character recognition.

In the case of a character (string) recognition apparatus by manual transfer operation; when the medium is swiped at high speed or the background of the medium is dark, the threshold value for binary conversion becomes relatively high so that lines of the characters become thick and blank spaces between neighboring two characters become narrow so as to lower the projection level at character border parts. Therefore, detection errors at character border parts may easily happen to eventually reduce the light intensity at the time of picking up the character string. As a result, the lines of the characters become thin and the resolution is lowered so that reading errors happen at high rates. However, according to the present invention; when it is judged that the border judgment threshold value is invalid, the reference threshold value for binary conversion is automatically changed to be smaller than the initial one. Therefore, even when the lines of the characters become thin, the probability of reading errors can be reduced. Furthermore, since the present invention does not make use of results of character recognition judgment results of characteristics of the character) as the conventional technology does, improvement in high-speed operation performance of character recognition can also be promoted.

(4) The method for character string recognition: wherein the prescribed border judgment threshold value corresponds to the "n+1"-th value of the peak values where the positive peak values included in the vertical projection data are disposed in due order starting from the largest one and the "n" represents the number of characters included in the character string.

According to at least an embodiment of the present invention; the prescribed border judgment threshold value described above corresponds to the "n+1"-th value of the peak values where the positive peak values included in the vertical projection data are disposed in due order starting from the largest one and the "n" represents the number of characters included in the character string. Therefore, the border judgment threshold value can be calculated easily.

(5) An apparatus for character string recognition including: means for recognizing a character string placed on a medium by using the method for character string recognition in accordance with any one of items (1) to (4) described above.

According to at least an embodiment of the present invention; it becomes possible to provide the apparatus for character string recognition including means for recognizing a character string placed on a medium by using any one of the methods for character string recognition described above.

Advantageous Effect of the Invention

The method and apparatus for character string recognition according to at least an embodiment of the present invention enables improvement in accuracy of character recognition through judging validity of the border judgment threshold value before judging characteristics of each character, and furthermore ensures high-speed operation performance in character recognition.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 shows image data obtained by picking up characters printed in an OCR character memory region (Refer to FIG. 1) of a record data carrier.

DESCRIPTION OF THE PREFERRED EMBODIMENT

A preferred embodiment of the present invention is described below with reference to the accompanying drawings.

(Character String Recognition Apparatus)

Figure 1:
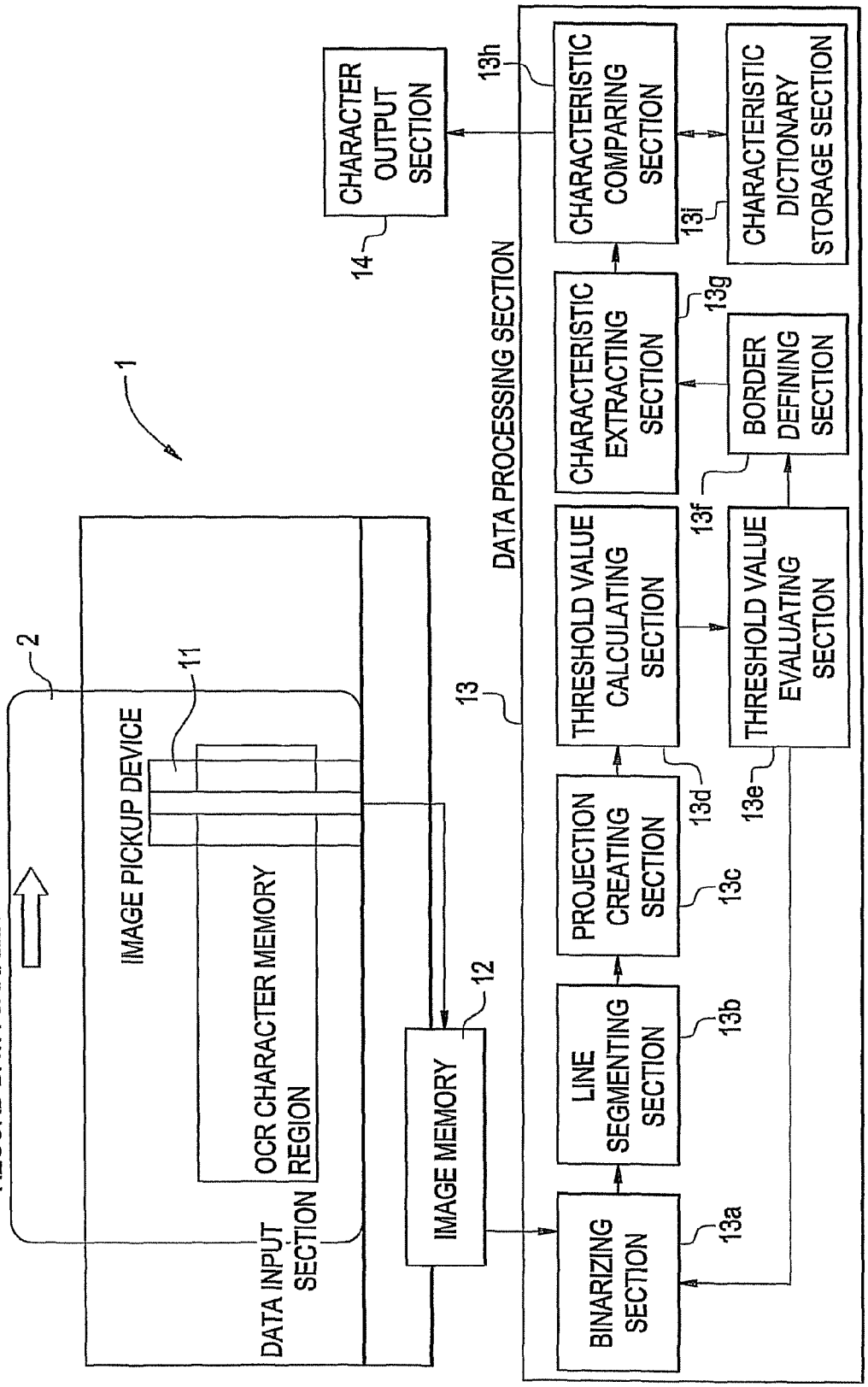
FIG. 1 is a block diagram showing an electrical structure of a character string recognition apparatus in accordance with the embodiment of the present invention.

FIG. 1 is a block diagram showing an electrical structure of a character string recognition apparatus 1 in accordance with an embodiment of the present invention.

In FIG. 1, the character string recognition apparatus 1 includes a contact-type (one-dimensional) image pickup device 11, an image memory 12, a data processing section 13, and a character output section 14 (such as a monitor). Then, the data processing section 13 has a binarizing section 13a, a line segmenting section 13b, a projection creating section 13c, a threshold value calculating section 13d, a threshold value evaluating section 13e, a border defining section 13f, a characteristic extracting section 13g, a characteristic comparing section 13h, and a characteristic dictionary storage section 13i. These sections function as an example of character string recognition means for recognizing a character string placed on a record data carrier 2. Furthermore, these sections can be materialized hardware-wise by using electrical devices such as CPUs and/or MPUs.

The image pickup device 11 picks up an OCR character string placed on the record data carrier 2, and photoelectrically converts the OCR character string. Then, the image data captured is once saved in the image memory 12. Subsequently the data processing section 13 reads the image data out of the image memory 12, and carries out various operations in the sections described above for consequently recognizing the OCR character string on the record data carrier 2.

The record data carrier 2 may be a common card in accordance with the JIS; for example may be a plastic card that is 86 mm wide, 54 mm high, and 0.76 mm thick; and may be an ID card, a passport, or a driver's license card.

(Character String Recognition Method)

Figure 2:
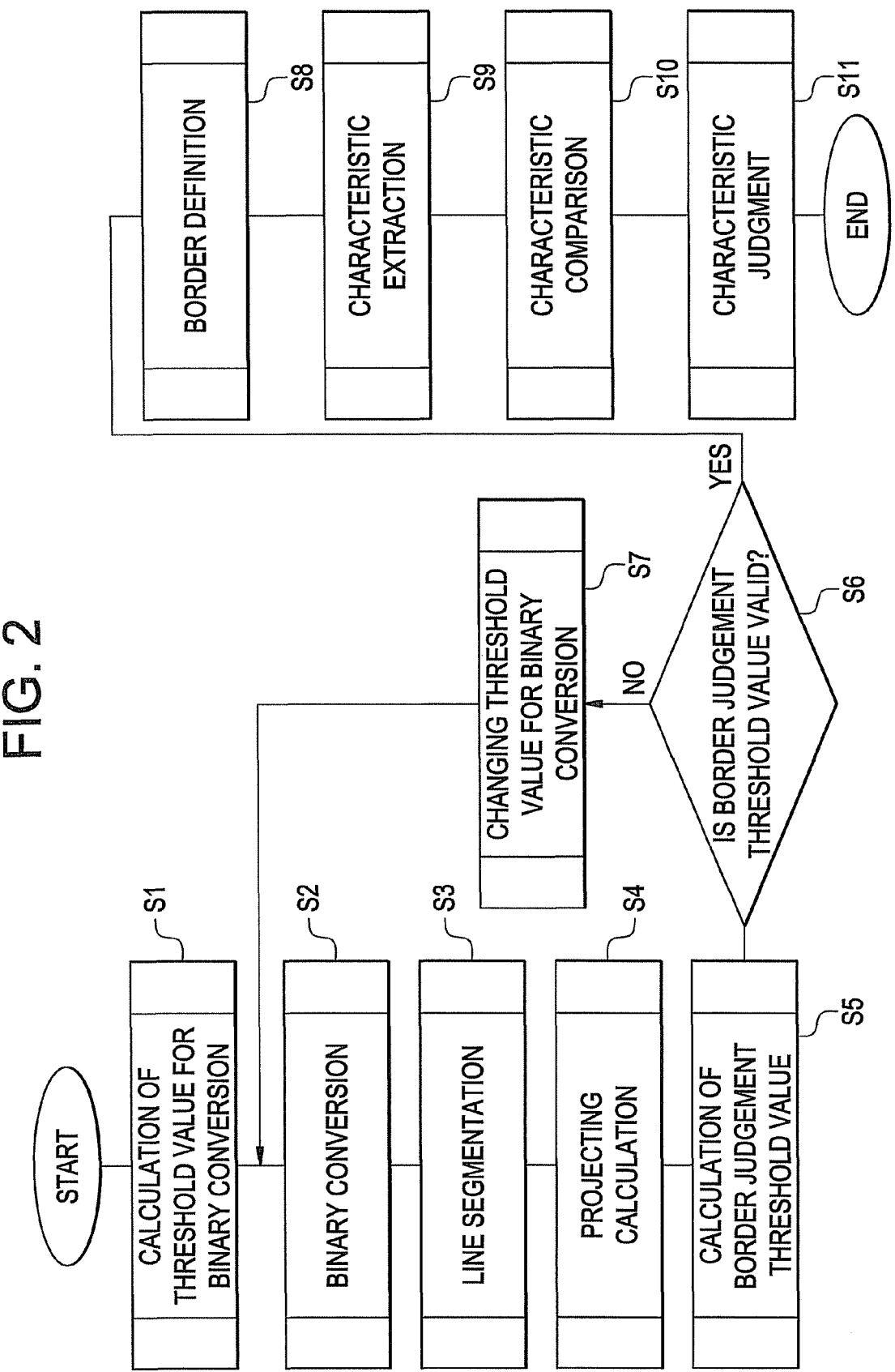
FIG. 2 is a flowchart describing a character string recognition method in accordance with the embodiment of the present invention.

FIG. 2 is a flowchart describing a character string recognition method in accordance with the embodiment of the present invention.

As shown in FIG. 2, a threshold value for binary conversion is calculated (Step S1) at first in the character string recognition method in accordance with the embodiment of the present invention. Concretely to describe, the a binarizing section 13a of the data processing section 13 reads the image data out of the image memory 12 and calculates a threshold value (a reference threshold value for binary conversion) with an appropriate method. For calculation of the threshold value, any method can be adopted. The reference threshold value for binary conversion calculated by Step S1 is used in the following Step S2.

Subsequently, binary conversion (Step S2) is carried out. Concretely to describe, the binarizing section 13a of the data processing section 13 reads the image data out of the image memory 12. Then, if the image data is of a multi-step gray scale image, the image data is converted into a black-and-white binary image (binary image data). The image memory 12 may be configured with any device such as RAM, SDRAM, DDRSDRAM, and RDRAM, as far as the device is able to store image data. Incidentally, Step S2 represents an example of a "first step" in which the image data is processed into the black-and-white binary image data by using the prescribed reference threshold value for binary conversion.

Line segmentation (Step S3) is carried out next. Concretely to describe, the line segmenting section 13b of the data processing section 13 projects the binarized character string in a horizontal direction to detect upper and lower edges of the character string. Then, while a center position between the upper and lower edges is recognized as a centerline of the character string, the line segmentation is carried out.

Projecting calculation (Step S4) is carried out next. Concretely to describe, the projection creating section 13c of the data processing section 13 carries out projecting calculation (Density projection) in a direction perpendicular to the direction of the character string for image data (Binary image data) of each character string detected in Step S3. This step is necessary for detecting character segmenting positions in a horizontal direction of each character string.

Step S4 represents an example of a "second step" in which vertical projection of the binary image data is calculated in the direction perpendicular to the direction of the character string while the binary image data being shifted in the direction of the character string. Incidentally, the density projection is a kind of histogram (Concentration distribution diagram), in which the number of pixels being each converted so as to have a density value of "1" or "0" through binary conversion is summed up for each density value, wherein either sum total of white pixels or black pixels may be calculated. Furthermore, summing up the number of pixels in the direction perpendicular to the horizontal axis (X-axis) is carried out within a range defined with end points that are the upper and lower edges (including some margin) of the character string obtained in the line segmentation of Step 2.

A concrete example of the step S4 is described below. FIG. 3 shows image data obtained by picking up characters printed in an OCR character memory region (Refer to FIG. 1) of the record data carrier 2. Meanwhile FIG. 4 shows a result (one example) of vertical projection of the image data shown in FIG. 3.

Figure 4:
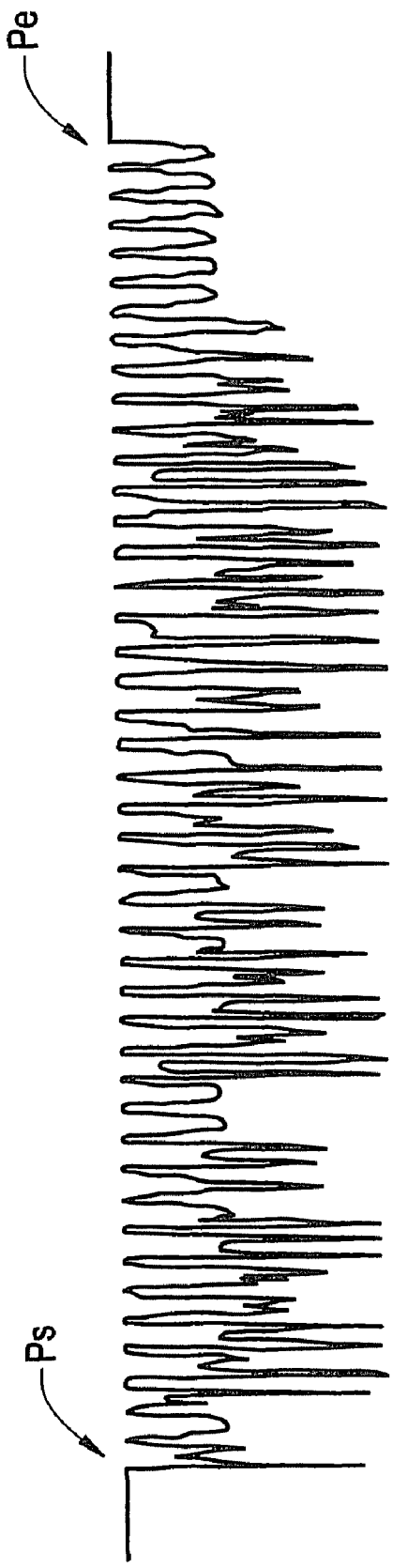
FIG. 4 shows a result (one example) of vertical projection of the image data shown in FIG. 3.

As shown in FIG. 4, the character line length (the number of pixels between both ends of the character string) is represented by the number of pixels existing between a position "Ps" and another position "Pe" in the vertical projection data. The number of pixels existing between the position "Ps" and position "Pe" has a close relationship with a speed of swiping the record data carrier 2. Namely, a low swiping speed results in a large number of pixels (to obtain a sufficient resolution), whereas a high swiping speed causes a small number of pixels.

Figure 5:
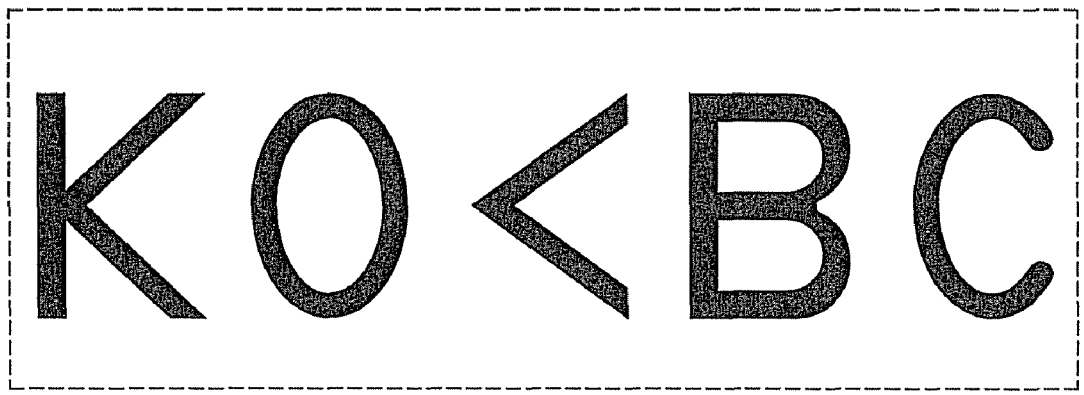
FIG. 5 shows image data of characters "KO<BC" that make up a character string.
Figure 6:
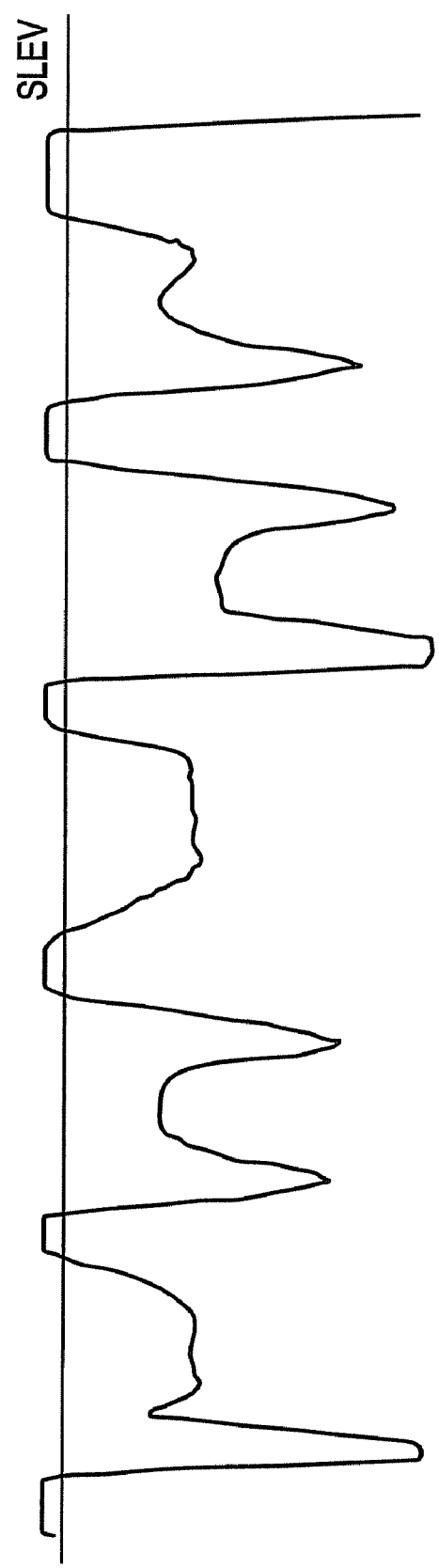
FIG. 6 is vertical projection data (one example) obtained by vertical projection of the image data shown in FIG. 5.

FIG. 5 shows image data of characters "KO<BC" that make up a character string. FIG. 6 is vertical projection data (one example) obtained by vertical projection of the image data shown in FIG. 5. Incidentally, FIG. 5 shows the image data of the part from "K" to "C" in FIG. 3.

A threshold value for judging character borders is calculated next (Step S5). Concretely to describe, in the threshold value calculating section 13d of the data processing section 13, all positive peak values included in the vertical projection data are detected at first to create a histogram of the positive peak values (to be virtually arranged on a system memory). Then, in the histogram of the positive peak values, a cumulative frequency in a direction from the maximum value to the minimum value is calculated so as to detect a point where the cumulative frequency exceeds the number of characters expected. Then, the peak value at the point is defined as the threshold value.

Figure 7:
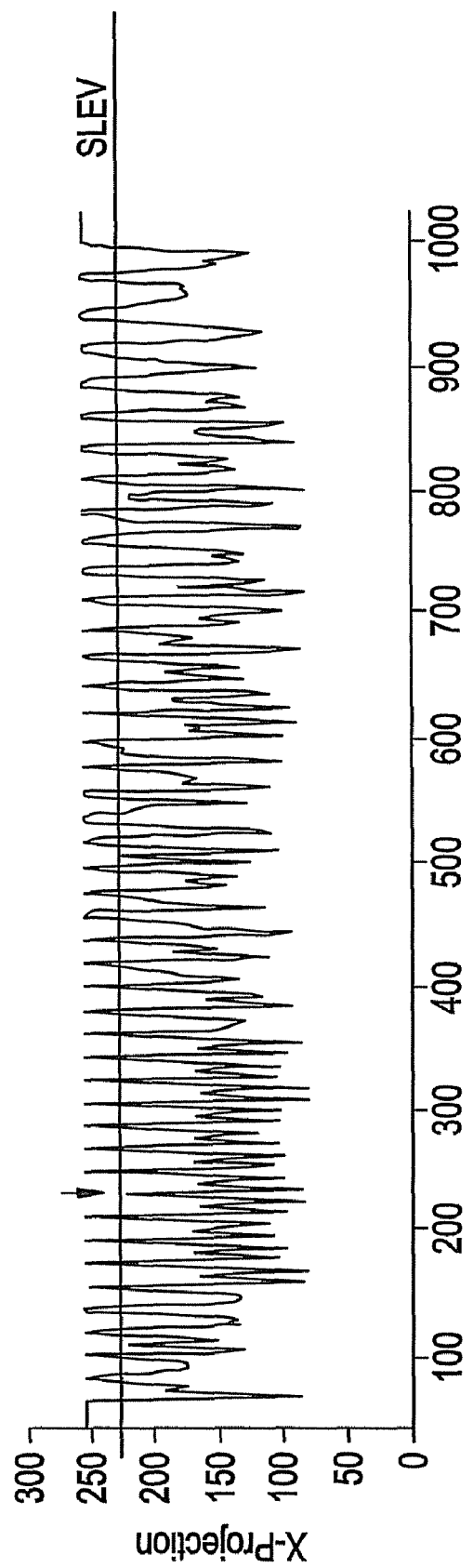
FIG. 7 shows a result (one example) of vertical projection of the image data shown in FIG. 3.
Figure 8:
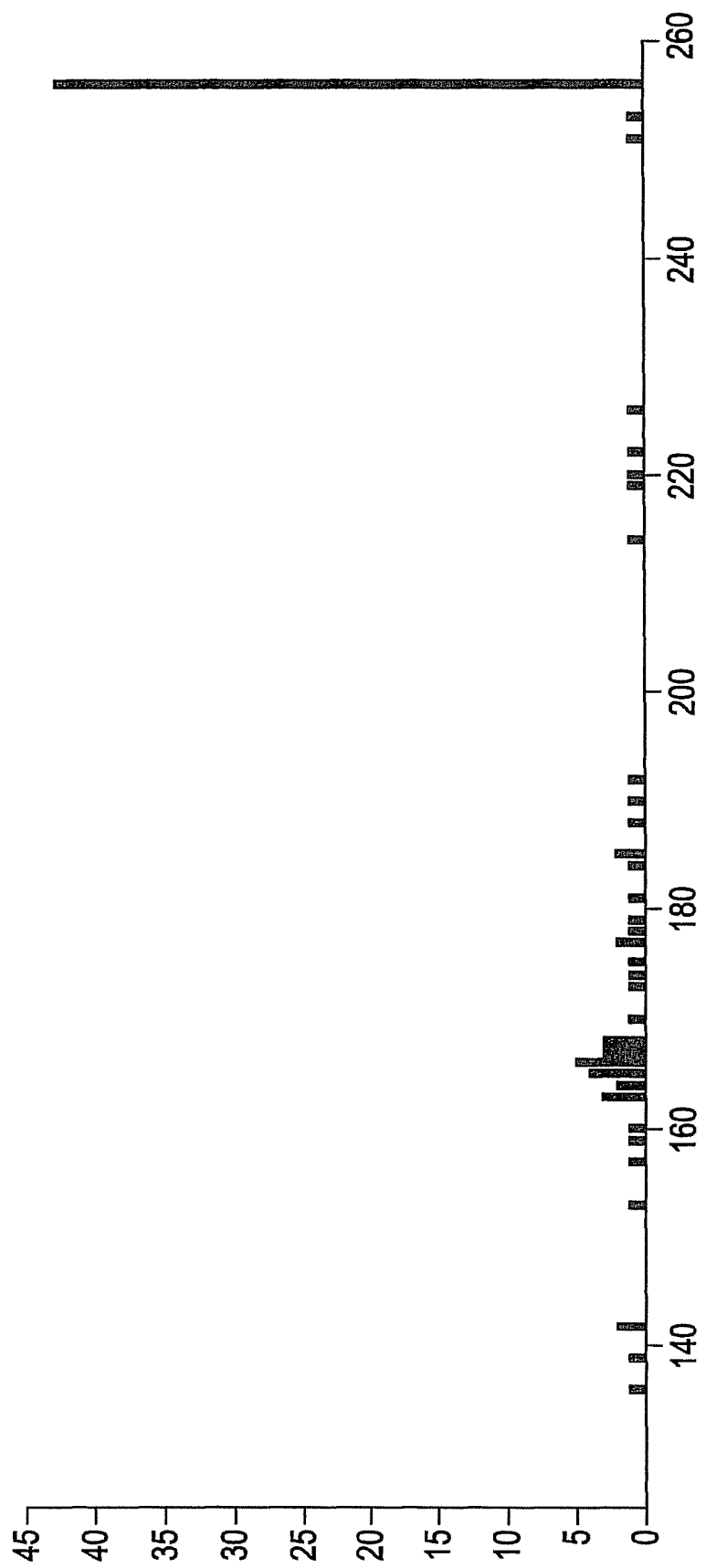
FIG. 8 is a histogram of the positive peak values in the vertical projection data shown in FIG. 7.
Figure 9:
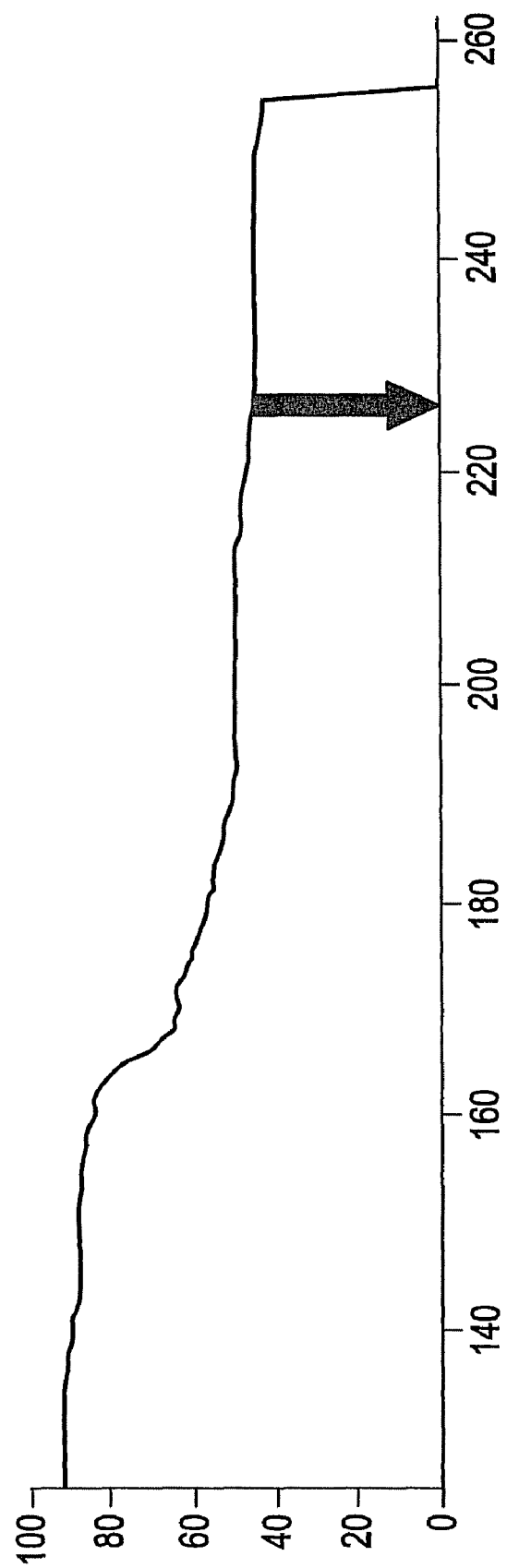
FIG. 9 is a diagram of calculation result of the cumulative frequency in a direction from the maximum value to the minimum value with reference to the histogram of FIG. 8.

Regarding Step S5, a concrete example is explained with reference to FIG. 7 through FIG. 9. FIG. 7 shows a result (one example) of vertical projection of the image data shown in FIG. 3. FIG. 8 is a histogram of the positive peak values in the vertical projection data shown in FIG. 7. FIG. 9 is a diagram of calculation result of the cumulative frequency in a direction from the maximum value to the minimum value with reference to the histogram of FIG. 8. In FIG. 8, the horizontal axis and the vertical axis represent the peak value and the number of times, respectively. Meanwhile, in FIG. 9, the horizontal axis and the vertical axis represent the peak value and the cumulative frequency, respectively.

According to FIG. 8, most of the peak values are positioned closely around an area of 255, while only 5 peak values in total are observed around an area of 220 for example. In accordance with FIG. 9 (tracing the line graph of FIG. 9 from the right end toward the left) meanwhile, the cumulative frequency on the positive peak values rapidly increases around the area of 255, and afterwards it increases just gently as the peak value becomes smaller.

Assuming that the number of characters to be recognized is 44, the border judgment threshold value (referred as "SLEV" in FIG. 7) is defined with a peak value 255 at which the cumulative frequency exceeds the above value 44, namely the cumulative frequency reaches 45 (i.e., "the number of characters to be recognized"+1) in FIG. 9. Thus, according to the present embodiment; the border judgment threshold value corresponds to the "n+1"-th value of the peak values where the positive peak values included in the vertical projection data are disposed in due order starting from the largest one and the "n" represents the number of characters included in the character string.

Figure 10:
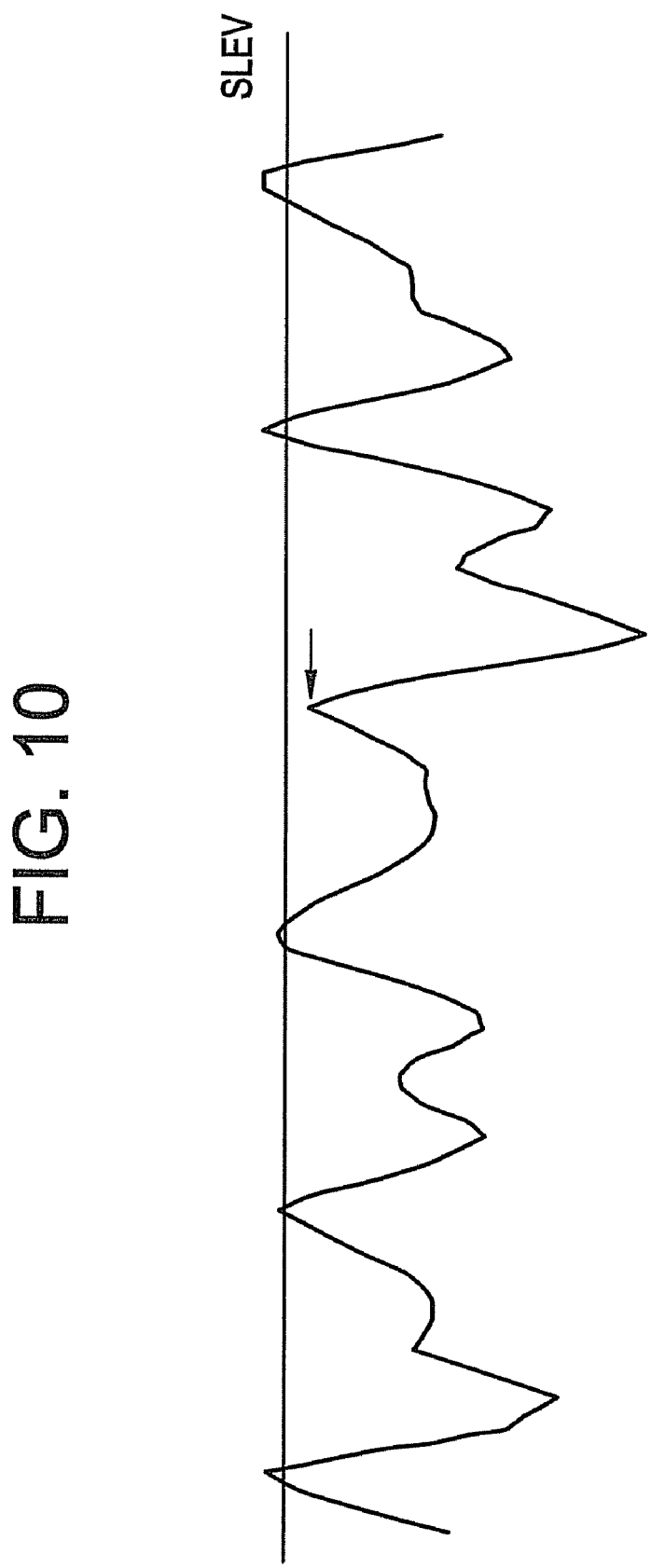
FIG. 10 is vertical projection data (one example) resulted from vertical projection of the image data shown in FIG. 5.

Then, validity of the border judgment threshold value is judged (Step S6). Concretely to describe, the threshold value evaluating section 13*e* of the data processing section 13 judges whether or not the border judgment threshold value resulted from Step S5 is valid. As shown in the concrete example illustrated in FIG. 7 through FIG. 9, a border judgment threshold value becomes relatively low mainly due to a high transfer speed of the record data carrier 2. When the transfer speed is relatively low, a blank space between neighboring two characters becomes wide so that the vertical projection data (projection profile) at the point has a wide peak, as FIG. 6 shows, and provides a sufficient output value. Meanwhile, when the transfer speed is high, the blank space between neighboring two characters becomes narrow and the vertical projection data becomes, as FIG. 10 shows. Incidentally, FIG. 10 is vertical projection data (one example) resulted from vertical projection of the image data shown in FIG. 5.

In FIG. 10, peak forms in the vertical projection data become sharpened and their level values are reduced. As a result, accuracy of detecting border peaks is lowered so that accurate character segmentation cannot be ensured. For example, in the concrete example illustrated in FIG. 7, the peak indicated with an arrow in the figure is lower than the level of the border judgment threshold value so that the peak part may not be recognized as a border between two characters.

However, when the peak values of the vertical projection data are recognized to be excessively low, readjustment of the threshold value for binary conversion of the image data (Changing the threshold value for binary conversion, indicated as Step S7) may justify the vertical projection data. Namely, when the border judgment threshold value is determined to be invalid, setting the reference threshold value for binary conversion with a value lower than the initial one increases the number of white pixels as a whole so that the peak values at borders increase and character borders can be detected stably.

Figure 11:
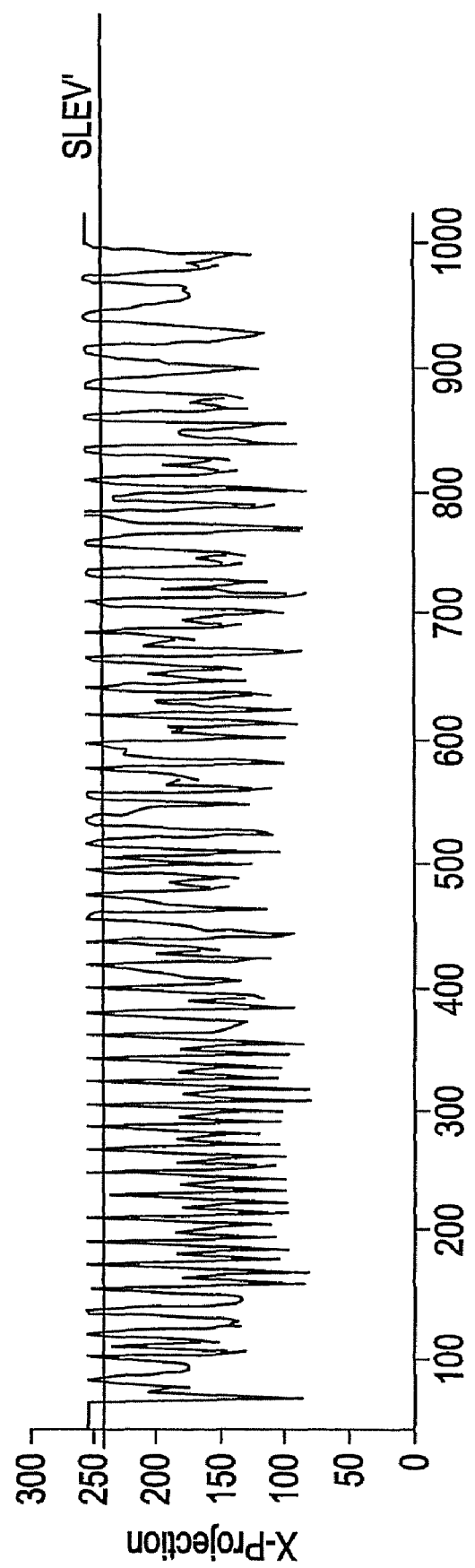
FIG. 11 shows a result (one example) of vertical projection of the image data shown in FIG. 3.
Figure 12:
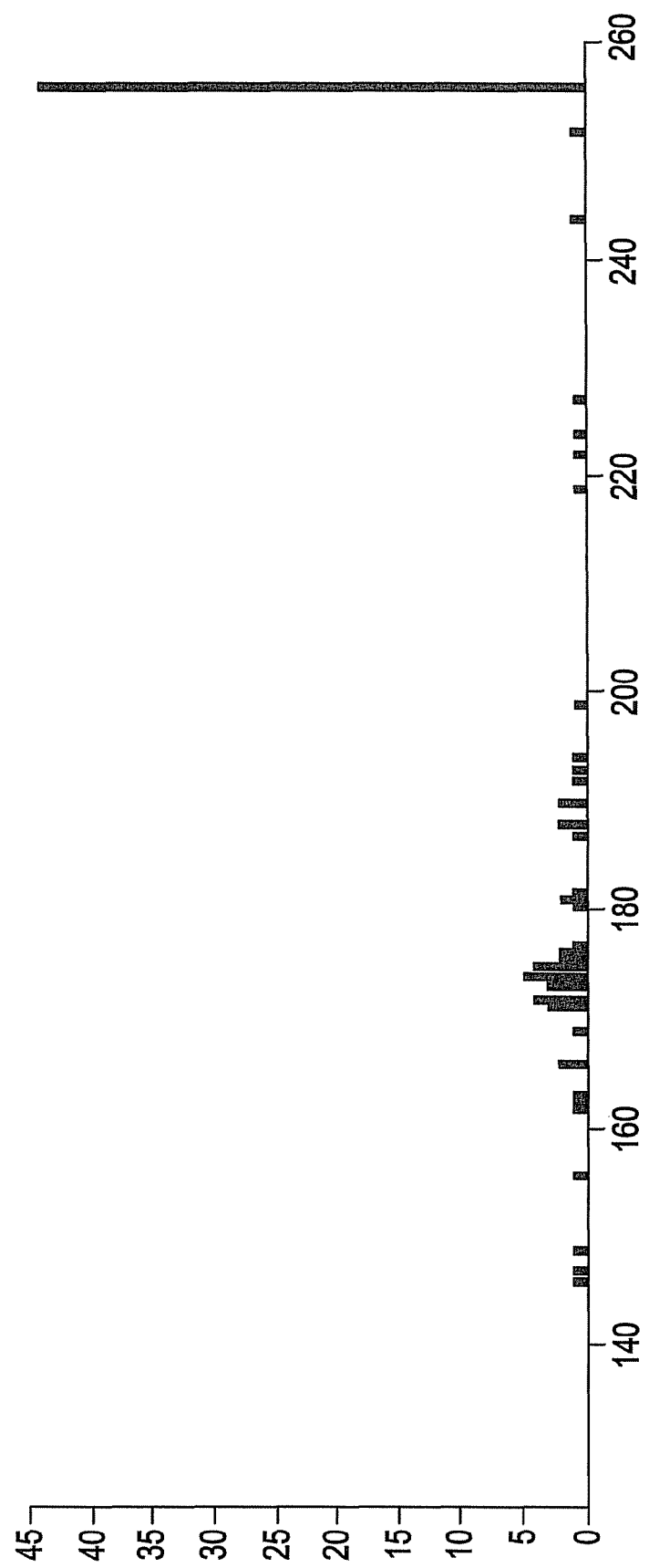
FIG. 12 is a histogram of the positive peak values in the vertical projection data shown in FIG. 11.
Figure 13:
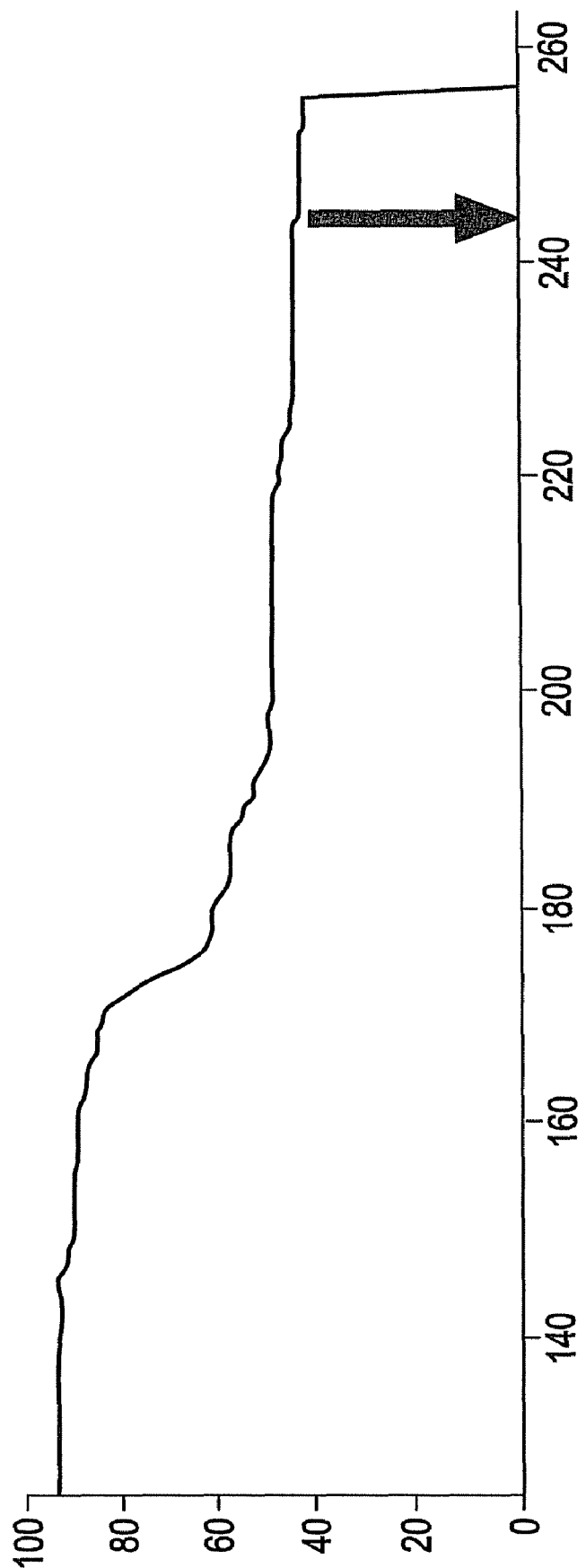
FIG. 13 is a diagram of calculation result of the cumulative frequency in a direction from the maximum value to the minimum value with reference to the histogram of FIG. 12.

Aspects of carrying out binary conversion again are described below with respect to FIG. 11 through FIG. 13. It is assumed that the border judgment threshold value known as an appropriate one according to experiments is 235 or greater. FIG. 11 shows a result (one example) of vertical projection of the image data shown in FIG. 3. FIG. 12 is a histogram of the positive peak values in the vertical projection data shown in FIG. 11. FIG. 13 is a diagram of calculation result of the cumulative frequency in a direction from the maximum value to the minimum value with reference to the histogram of FIG. 12.

In the concrete example illustrated in FIG. 7, the border judgment threshold value, SLEV, is 225 and the threshold value does not satisfy the condition of "SLEV≧235" (Step S6: NO). Therefore, having gone through a procedure of Step S7, the operation returns to the step of binary conversion (Step S2) to carry out binary conversion again. Concretely to describe, the threshold value for binary conversion was initially defined as "SLEV=80", and it is now changed with a new value; i.e., "SLEV'=SLEV−10=70" (one example of the procedure of Step S7). Then the image data is binarized again with the new threshold value (Step S2); and the vertical projection data (projection profile) is obtained (FIG. 11) in the same manner as the concrete example shown in FIG. 7 through FIG. 9. When the border judgment threshold value is calculated again according to the histogram (FIG. 12) created by counting all the positive values in the vertical projection data, the result is "SLEV'=243", as shown in FIG. 11 and FIG. 13. The value of SLEV' satisfies the condition of "SLEV'≧235" this time, and therefore the result is acceptable (Step S6: YES).

Thus, in Step S6, depending on if the border judgment threshold value is at an appropriate level, it is determined whether the binary conversion is to be carried out again or not. Therefore, Step S6 represents an example of a "fifth step" in which validity of the border judgment threshold value is judged according to the number of characters in the character string. In a conventional embodiment, the validity is evaluated for the first time through character recognition steps (Step S9 through Step S11) that are described later; and in case of insufficient validity, scanning operation is carried out again, or binary conversion is carried out again with a threshold value for binary conversion that is newly set. However, in the character string recognition method according to the present embodiment, validity of the character border judgment threshold value is examined (Step S6) before border definition (Step S8) and characteristic extraction (Step S9), and the examination result is fed back. As a result, the operation time advantageously becomes shorter.

Thus, if it is judged that the border judgment threshold value is appropriate (Step S6: YES), border definition is carried out (Step S8). Concretely to describe, the border defining section 13*f* of the data processing section 13 compares level values of the projection profile with the border judgment threshold value, which is judged to be appropriate in Step S6, so as to determine each region exceeding the border judgment threshold value as a blank space between neighboring two characters (defining a character border). Incidentally, a middle point of each blank space may be determined as a border position. Then, Step S8 represents an example of a "third step" in which positions exceeding the prescribed border judgment threshold value (which is judged to be appropriate in Step S6) in the vertical projection data obtained in Step S4 are detected as segmentation positions of characters included in the character string.

Figure 14:
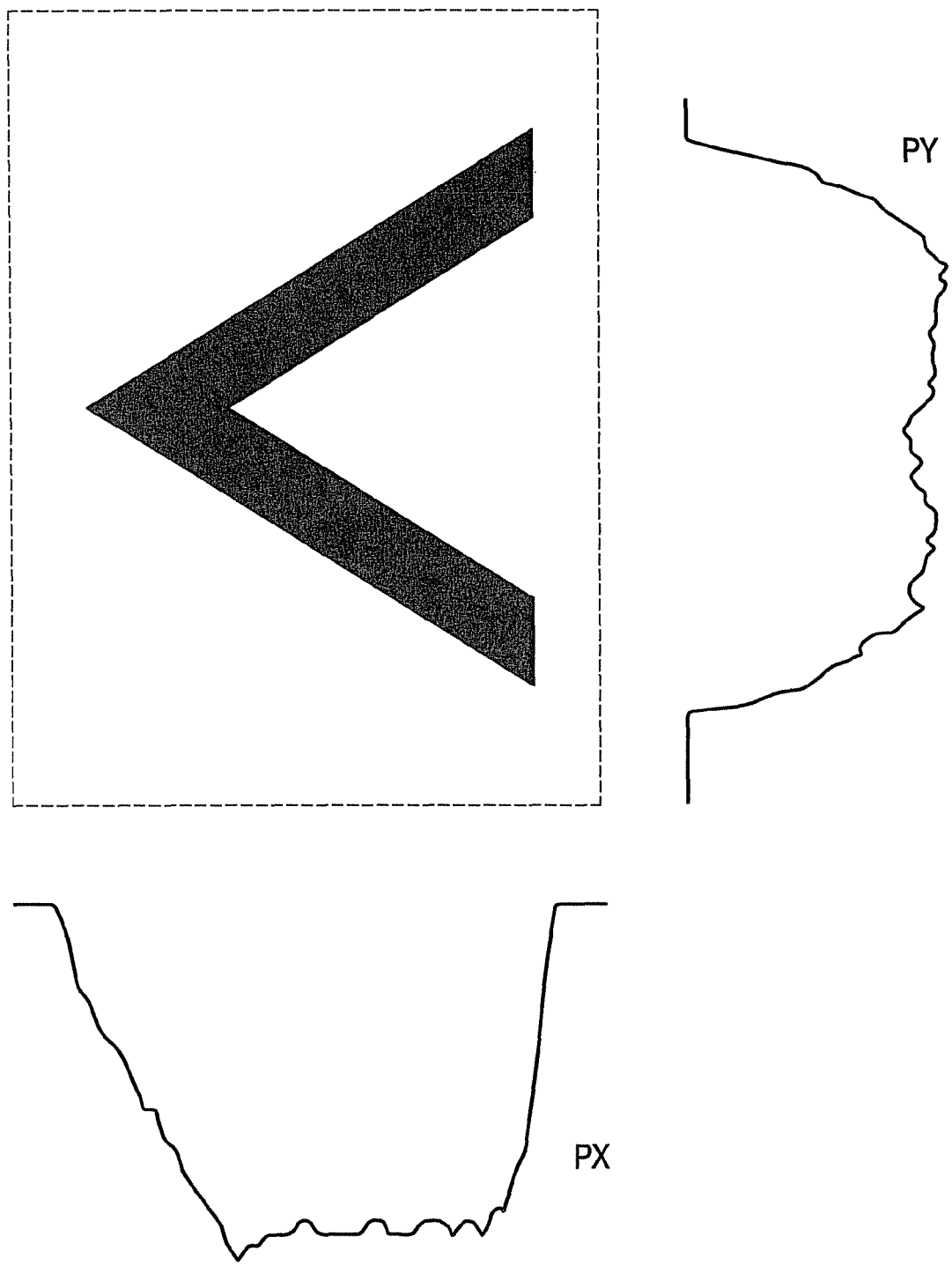
FIG. 14 shows image data of "<" included in a character string.

Thus, after the right and left border positions of each character are tentatively determined through operation of Step S8, the character inside the circumscribed rectangular area is calculated as shown in FIG. 14, which shows image data of "<" included in the character string.

In FIG. 14, a vertical projection "PX" and a horizontal projection "PY" are calculated for the purpose of accurately identifying a position of the character "<". Along a curve of the vertical projection "PX", the right and left border positions of the character are detected. That is to say; starting from the left end point of the rectangular area, a scanning operation is carried out along the vertical projection "PX" toward the right. When the level value (Pixel detection) is smaller than the threshold value for the prescribed number of times (e.g., 3 times) continuously at a position, the left edge of the character is defined at the position that satisfies the above condition for the first time. Likewise, starting from the right end point of the rectangular area, another scanning operation is carried out along the vertical projection "PX" toward the left. When the level value is smaller than the threshold value for the prescribed number of times continuously at a position, the right edge of the character is defined at the position that satisfies the above condition for the first time.

Likewise, along a curve of the horizontal projection "PY"; scanning operations are carried out inward from the outside, using the area segmented with the right and left edge positions obtained through the border definition as a definition area, and starting from the upper and lower end points of the rectangular area. When the level value is smaller than the threshold value for the prescribed number of times continuously at a position, each of the upper and lower edges of the character is defined at the position that satisfies the above condition for the first time. Thus, each character position within the character string can be specified.

Then, characteristic extraction is carried out (Step S9) next. Concretely to describe, in the characteristic extracting section 13g of the data processing section 13, the circumscribed rectangular area described above is split into an optional number of sub areas (For example, the rectangular area is split into 5 by 5 areas to make up each sub area). Then, percentage of black pixels in all the pixels of each sub area is calculated, and characteristic vectors including the percentage value as an element are created. Then, Step S9 represents an example of a "fourth step" in which characters are segmented out of the character string according to the segmentation positions of characters detected in Step S8 and characteristics of each of the segmented characters are examined.

Then, characteristic comparison is carried out (Step S10) next. Concretely to describe, in the characteristic comparing section 13h of the data processing section 13, the characteristic vectors obtained in Step S9 are compared with the standard characteristic vectors calculated beforehand for all characters to be used for the record data carrier 2; and as a result, a candidate character having a highest level of similarity (e.g., a normalized correlation factor) is set for the corresponding character.

The standard characteristic vectors are stored beforehand in the characteristic dictionary storage section 13i. For the characteristic comparison, data of a character having a high level of similarity is read out of the characteristic dictionary storage section 13i.

In the end, character judgment is carried out (Step S11). Concretely to describe, the candidate character set as a result of the characteristic comparison, i.e. Step S10, is recognized for the corresponding character used in the record data carrier 2. If there exist a plurality of candidate characters each of which is provided with a level of similarity higher than a prescribed level, the character recognition cannot be carried out. Therefore, in such a case, the similar characters are distinguished by making use of secondary characteristic properties drawn out of the characteristic vectors.

For example, the sub areas prepared by splitting optionally may be grouped into two regions, i.e. axis-symmetirical right and left halves, to make up sectional characteristic vectors for checking similarity in those sectional characteristic vectors. Likewise, the sub areas may also be grouped into other two regions, i.e. axis-symmetirical upper and lower halves, for the same purpose. Furthermore, similarity may be checked in terms of point symmetry instead of the axis-symmetry in right and left halves or upper and lower halves.

Furthermore, since 3 kinds of form characteristic properties are obtained for each character, a corresponding character may be assigned according to correlation of those characteristic properties. Still further, there may be some cases where the similar characters cannot be distinguished. In some cases of types of characters used in the record data carrier 2, for example, distinguishing 'O' from '0' may be difficult. In such a case, those characters can be distinguished by examining, for example, differences in the character height, curvature at corners, and so on.

(Advantageous Effect of the Embodiment)

As described above, the character string recognition method according to the present embodiment is used in the character string recognition apparatus in which main scanning is carried out with one-dimensional image pickup device for a character string including the known number of characters printed at a known position on a medium, meanwhile sub-scanning is carried out through transferring the medium by manual operation or mechanical driving so as to create two-dimensional image data, and the image data is appropriately processed for recognizing the character string. Especially, the character string recognition method includes; a step of binary conversion (Refer to Step S2 in FIG. 2) for binarizing the multilevel image obtained by scanning the medium; a step of projection creating (Refer to Step S4 in FIG. 2) for creating a projection profile of the main scanning direction with respect to the image area including the characters for the purpose of detecting character segmentation positions in the character string placed along the medium transfer direction; a step of calculating the border judgment threshold value (Refer to Step S5 in FIG. 2) required for defining character borders according to the projection data; and a step of evaluating the threshold value (Refer to Step S6 in FIG. 2) for judging whether or not the border judgment threshold value is valid. Furthermore, the character string recognition method includes a path for carrying out the binary conversion again (Refer to Step S7 in FIG. 2) on the multilevel medium image when the border judgment threshold value is judged to be invalid. Therefore, being independent from the result of the character judgment (Refer to Step S11 in FIG. 2), validity of the binary conversion can be automatically judged at an intermediate stage so that the character recognition can be carried out precisely and quickly.

Moreover, in order to determine the threshold value for defining character borders, all peaks included in vertical projection data are detected. Then the threshold value is determined according to a histogram of positive peak values out of all the peaks. Therefore, the threshold value for the border definition can be set more precisely.

Still further, in the histogram of the peak values described above, a cumulative frequency in a direction from the maximum value to the minimum value is calculated so as to define the border judgment threshold value with a peak value at which the cumulative frequency exceeds the number of characters expected. Therefore, the character border definition can be carried out more easily.

Incidentally, a one-dimensional image pickup device 11 and a linear transfer mechanism are used in this embodiment, but the present invention is not limited to these devices. For example, any combination including a two-dimensional CCD, an area sensor such as a C-MOS imager, and an object support mechanism may be applied. Furthermore, the recognition object may be not only printed type but also handwritten letters. Moreover, the present invention may be applied not only to character recognition but also to recognition of decoding data such as one-dimensional and two-dimensional barcodes.

Industrial Applicability

The method and apparatus for character string recognition in accordance with the present invention are useful for enabling prevention of a decrease in accuracy for character string recognition as well as improvement in character recognition speed.

Reference Numerals

1. Character string recognition apparatus
2. Record data carrier
11. Image pickup device
12. Image memory
13. Data processing section
13a. Binarizing section
13b. Line segmenting section
13c. Projection creating section
13d. Threshold value calculating section
13e. Threshold value evaluating section
13f. Border defining section
13g. Characteristic extracting section
13h. Characteristic comparing section
13i. Characteristic dictionary storage section
14. Character output section While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

While the preferred embodiments of the present invention have been described using specific terms, such description is for illustrative purposes only, and it is to be understood that changes and variations may be made without departing from the spirit or scope of the appended claims.

What is claimed is:

1. A method for character string recognition by processing image data obtained through picking up a character string placed on a medium comprising:
    processing the image data into black-and-white binary image data by using a prescribed reference threshold value for binary conversion;
    calculating vertical projection data of the binary image data in a vertical direction perpendicular to a direction of the character string while shifting the binary image data in the direction of the character string;
    detecting positions exceeding a prescribed border judgment threshold value in the vertical projection data as segmentation positions of characters included in the character string;
    judging validity of the border judgment threshold value according to the number of characters included in the character string;
    if the border judgment threshold value is judged to be valid, segmenting the characters out of the character string according to the segmentation positions of the characters, and examining characteristics of each character segmented; and
    if the border judgment threshold value is judged to be invalid, repeating the method from the step of processing the image data into black-and-white binary image data without segmenting the characters out of the character string.

2. The method for character string recognition according to claim 1:
    wherein the reference threshold value for binary conversion is changed when the border judgment threshold value is judged to be invalid.

3. The method for character string recognition according to claim 2:
    wherein the reference threshold value for binary conversion is changed to be smaller than the initial one when the border judgment threshold value is judged to be invalid.

4. The method for character string recognition according to claim 3:
    wherein the prescribed border judgment threshold value corresponds to the "n+1"-th value of the peak values where the positive peak values included in the vertical projection data are disposed in due order starting from the largest one and the "n" represents the number of characters included in the character string.

5. The method for character string recognition according to claim 2:
    wherein the prescribed border judgment threshold value corresponds to the "n+1"-th value of the peak values where the positive peak values included in the vertical projection data are disposed in due order starting from the largest one and the "n" represents the number of characters included in the character string.

6. The method for character string recognition according to claim 1:
    wherein the prescribed border judgment threshold value corresponds to the "n+1"-th value of the peak values where the positive peak values included in the vertical projection data are disposed in due order starting from the largest one and the "n" represents the number of characters included in the character string.

7. The method for character string recognition according to claim 1:
    wherein the border judgment threshold value is a positive peak corresponding to the "n+1"-th number of the character string that make up the number of positive peaks contained in the vertical projection data, where "n" represents the number of characters included in the character string.

8. An apparatus for character string recognition for use with a record data carrier having a character string, the apparatus comprising:
    an image pickup device configured to read and photoelectrically convert the character string into image data;

an image memory configured to store the image data;

a binarizinq section configured to process the image data into black-and-white binary image data by using a prescribed reference threshold value for binary conversion;

a projection creating section configured to calculate vertical projection data of the binary image data in a vertical direction perpendicular to a direction of the character string while shifting the binary image data in the direction of the character string;

a threshold value calculating section configured to detect vertical projection data of the binary image data in a vertical direction perpendicular to a direction of the character string while shifting the binary image data in the direction of the character string;

a threshold value evaluating section configured to judge validity of the border judgment threshold value according to the number of characters included in the character string; and a border defining section configured to segment the characters out of the character string according to the segmentation positions of the characters if the border judgment threshold value is judged to be valid;

wherein, if the border judgment threshold value is judged to be invalid, the apparatus is configured such that the binarizing section repeats processing the image data into black-and-white binary image data by using a prescribed reference threshold value for binary conversion, without segmenting the characters out of the character string.

9. The apparatus according to claim 8, wherein the reference threshold value for binary conversion is changed when the border judgment threshold value is judged to be invalid.

10. The apparatus according to claim 9, wherein the reference threshold value for binary conversion is changed to be smaller than the initial one when the border judgment threshold value is judged to be invalid.

11. The apparatus according to claim 8, wherein the prescribed border judgment threshold value corresponds to the "n+1"-th value of the peak values where the positive peak values included in the vertical projection data are disposed in due order starting from the largest one and the "n" represents the number of characters included in the character string.

\* \* \* \* \*